United States Patent
Karwacki, Jr. et al.

(10) Patent No.: US 7,285,154 B2
(45) Date of Patent: Oct. 23, 2007

(54) XENON RECOVERY SYSTEM

(75) Inventors: Eugene Joseph Karwacki, Jr., Orefield, PA (US); Timothy Christopher Golden, Allentown, PA (US); Bing Ji, Allentown, PA (US); Stephen Andrew Motika, Kutztown, PA (US); Thomas Stephen Farris, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 412 days.

(21) Appl. No.: 10/996,743

(22) Filed: Nov. 24, 2004

(65) Prior Publication Data

US 2006/0107831 A1    May 25, 2006

(51) Int. Cl.
    *B01D 53/02*    (2006.01)
(52) U.S. Cl. ............. 95/96; 95/97; 95/98; 95/102; 95/104; 95/105; 95/106; 95/127; 95/148
(58) Field of Classification Search .......... 95/96, 95/97, 98, 102, 104, 105, 127, 148, 106, 95/114
    See application file for complete search history.

(56) References Cited

U.S. PATENT DOCUMENTS 3,971,640 A * 7/1976 Golovko .............. 95/114

| | | |
|---|---|---|
| 4,674,099 A | 6/1987 | Turner |
| 5,520,169 A | 5/1996 | Georgieff et al. |
| 6,098,282 A | 8/2000 | Frankeny et al. |
| 6,134,914 A | 10/2000 | Eschwey et al. |
| 6,236,041 B1 | 5/2001 | Donnerhack et al. |
| 6,408,849 B1 | 6/2002 | Spiegelman et al. |
| 6,658,894 B2 | 12/2003 | Golden et al. |
| 6,829,907 B2 * | 12/2004 | Higginbotham et al. ...... 62/648 |

FOREIGN PATENT DOCUMENTS

WO    WO 03/092778    11/2003

* cited by examiner

*Primary Examiner*—Robert A. Hopkins
(74) *Attorney, Agent, or Firm*—Lina Yang; Geoffrey L. Chase

(57) ABSTRACT

A first aspect of a process of recovering xenon from feed gas includes: providing an adsorption vessel containing adsorbent having a Xe/$N_2$ selectivity ratio <75; feeding into the adsorption vessel feed gas having an initial nitrogen concentration >50% and an initial xenon concentration $\geq 0.5\%$; evacuating the adsorption vessel; and purging the adsorption vessel at a purge-to-feed ratio $\geq 10$. The final xenon concentration is $\geq 15\times$ the initial xenon concentration. A second aspect of the process includes providing an adsorption vessel containing adsorbent having a Xe Henry's law Constant $\geq 50$ mmole/g/atm; feeding into the adsorption vessel feed gas having an initial nitrogen concentration >50% and an initial xenon concentration $\geq 0.5\%$; heating and purging the adsorption vessel to recover xenon having a final concentration $\geq 15\times$ its initial concentration. Apparatus for performing the process are also described.

24 Claims, 6 Drawing Sheets

XENON RECOVERY SYSTEM

BACKGROUND OF THE INVENTION

The present invention pertains to a gas separation and purification process and an apparatus therefor, more specifically to a process and an apparatus for recovering xenon.

Demand for xenon is growing based on emerging applications in the manufacturing and healthcare industries.

Xenon is now used in semiconductor related manufacturing processes, such as etching and lithography. It is an attractive additive gas for plasma-based processes because of its size (xenon is one of the largest rare gases), as well as the number of valence level electrons. For example, the addition of xenon can help moderate the electron temperature of plasmas, which can assist with developing new reaction pathways.

Xenon also finds increasing use in the healthcare industry as an anesthetic gas (see, e.g., U.S. Pat. No. 6,236,041 to Donnerhack et al.) and in medical imaging (see, e.g., U.S. Pat. No. 6,408,849 to Spiegelman et al.).

Xenon is also a byproduct from etching processes that employ $XeF_2$. This molecule decomposes on the surfaces of materials such as silicon to release atomic fluorine. The xenon then departs from the surface back into the gas phase.

However, a potential barrier to increased xenon utilization is the relatively high cost of xenon. Xenon exists within the atmosphere at a concentration of only 80 ppb. Thus, the industry has sought to provide methods that extract xenon from air at a lower cost, as well as processes that can reclaim xenon from process effluents before re-introduction to the atmosphere.

U.S. Patent Application Publication No. 2003/0000385 A1 to Kawai et al. discloses a gas separation process and apparatus for obtaining purified gases, such as krypton and xenon. The process comprises a combination of: (1) an equilibrium pressure swing adsorption process for separating gas components based on the difference in equilibrium adsorption; and (2) a rate-dependent pressure swing adsorption process for separating the gas components based on the difference in adsorption rates.

In the healthcare context, the attractiveness of using xenon as an anesthetic has been enhanced by methods of recycling xenon from exhaled gases for further use. For example, U.S. Pat. No. 5,520,169 to Georgieff et al. discloses a method comprising cleaning, compressing and cooling exhaled gas so as to selectively liquefy xenon. The other components of the exhaled composition remain gaseous and are separated from the liquid xenon. Separation based on adsorption is not disclosed.

U.S. Pat. No. 6,134,914 to Eschwey et al. also relates to recycling xenon from exhaled gases. This patent finds fault with the high complexity of devices according to Georgieff et al., as well as the degree of transfer in xenon recovery. Eschwey et al. also teaches a method based on differential phase change separation, but claims to improve upon Georgieff et al. by condensing the exhaled gases under a pressure from 0.6 bar to 150 bar, reducing the purity requirements for the xenon, and compensating for any additional residual fractions of oxygen in the recovered xenon by appropriately adjusting the proportion of oxygen added to the recovered xenon when the anesthetic gas is remixed. Separation based on adsorption is not disclosed.

WO 03/092778 A1 to Taveira et al. also discloses means for recycling xenon from exhaled gases. The exhaled anesthetic gases are first conveyed through a phase change filtration system to remove bacteria and reduce the amount of water vapor, volatile organics and fluorine anesthetics in the mixture. The resulting gas mixture is then passed through a column packed with an adsorbent, such as zeolite 5A, that selectively adsorbs more xenon than oxygen and nitrogen. The xenon-rich gas mixture from the column is then further purified by vacuum swing adsorption using a carbon molecular sieve as the adsorbent.

U.S. Pat. No. 4,674,099 to Turner discloses a method and apparatus for recycling rare gases, such as xenon, from a spent lasing gas mixture from an excimer laser. The rare gases are recovered by passing the gas mixture through a cleaning element comprising in series a hot metal reactor, a heat exchanger and a cryotrap-filter combination.

U.S. Pat. No. 6,658,894 to Golden et al. discloses a method and an apparatus for recovering xenon and/or krypton from an oxygen containing gas, such as liquid oxygen bottoms in a cryogenic air separation plant, by selective adsorption on a Li and Ag exchanged zeolite containing 5 to 40% Ag exchange capacity on an equivalents basis, with periodic thermal regeneration of the adsorbent.

Despite the foregoing developments, it is still desired to provide additional and improved means to obtain xenon from gaseous mixtures.

All references cited herein are incorporated herein by reference in their entireties.

BRIEF SUMMARY OF THE INVENTION

Accordingly, the invention provides a process of recovering xenon from a feed gas, a first embodiment of said process comprising the steps of:

providing an adsorption vessel containing an adsorbent having a $Xe/N_2$ selectivity ratio of less than 75;

feeding a feed gas into the adsorption vessel, wherein the feed gas comprises an initial concentration of nitrogen greater than 50% and an initial concentration of xenon of at least 0.5%;

evacuating the adsorption vessel by reducing a pressure of the adsorption apparatus below atmospheric pressure to recover a first xenon-enriched gas;

purging the adsorption vessel at a purge to feed ratio of at least 10 to recover a second xenon-enriched gas; and combining the first xenon-enriched gas and the second xenon-enriched gas to provide a product gas comprising a final concentration of xenon at least 15 times greater than the initial concentration of xenon.

In a second embodiment of the process of recovering xenon from a feed gas, said process comprises the steps of:

providing an adsorption vessel containing an adsorbent having a Xe Henry's law Constant of at least 50 mmole/g/atm;

feeding a feed gas into the adsorption vessel, wherein the feed gas comprises an initial concentration of nitrogen greater than 50% and an initial concentration of xenon of at least 0.5%;

heating the adsorbent to a temperature of at least 100° C. to recover a first xenon enriched gas;

purging the adsorption vessel to recover a second xenon-enriched gas; and combining the first xenon-enriched gas and the second xenon-enriched gas to provide a product gas comprising a final concentration of xenon at least 15 times greater than the initial concentration of xenon.

Further provided is a xenon recovery apparatus adapted to perform the first embodiment of the process of the invention, said apparatus comprising:

a surge vessel in fluid communication with a source of an effluent gas comprising Xe, and at least one member selected from the group consisting of $H_2O$, $O_2$ and $CO_2$, wherein the surge vessel contains a material adapted to adsorb from the effluent gas at least one of $H_2O$, $O_2$ and $CO_2$ more effectively than Xe;

an adsorption vessel in fluid communication with the surge vessel, and containing an adsorbent having a Xe/$N_2$ selectivity ratio of less than 75;

a nitrogen surge vessel adapted to receive nitrogen from the adsorption vessel during the evacuating step and supply nitrogen to the adsorption vessel during the purging step;

a pump adapted to evacuate the first xenon-enriched gas from the adsorption vessel;

a compressor adapted to compress the product gas;

a cold trap adapted to cool the compressed product gas so as to remove an additional amount of nitrogen gas from the product gas to provide a solid or liquid product comprising xenon; and control electronics programmed to maintain the purge to feed ratio of at least 10.

Still further provided is a xenon recovery apparatus adapted to perform the second embodiment of the process of the invention, said apparatus comprising:

a surge vessel in fluid communication with a source of an effluent gas comprising Xe, and at least one member selected from the group consisting of $H_2O$, $O_2$ and $CO_2$, wherein the surge vessel contains a material adapted to adsorb from the effluent gas at least one of $H_2O$, $O_2$ and $CO_2$ more effectively than Xe;

an adsorption vessel in fluid communication with the surge vessel, and containing an adsorbent having a Xe Henry's Constant of at least 50 mmole/g/atm;

a heater adapted to heat the adsorption vessel;

a nitrogen surge vessel adapted to receive nitrogen from the adsorption vessel during the heating step and supply nitrogen to the adsorption vessel during the purging step;

a compressor adapted to compress the product gas;

a cold trap adapted to cool the compressed product gas so as to remove an additional amount of nitrogen gas from the product gas to provide a solid or liquid product comprising xenon; and control electronics programmed to adjust the heater to maintain the temperature of the adsorption vessel at 100° C. or more.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

This invention provides means for recovering xenon from gas mixtures, such as manufacturing effluent gases, using an adsorption-based process.

The preferred process of the invention is for the recovery of xenon from a nitrogen-rich, xenon-containing feed gas. The source of the feed gas is not particularly limited. In certain embodiments, the feed gas is an effluent gas from a semiconductor related manufacturing process, such as etching, or Extended Ultra-Violet (EUV) lithography, or Plasma Enhanced-CVD. In other embodiments, the feed gas can derive from a purchased source. In still other embodiments, the feed gas is exhaled respiratory gases from an anesthetized patient. The feed gas is preferably dilute in xenon (0.5% to 5.0% xenon, or 0.5% to 1.5% xenon, or 1.0% to 2.5% xenon). Nitrogen can be added to the feed gas if the feed gas, as obtained from the feed gas source, contains an insufficient amount of nitrogen.

In certain embodiments, the feed gas can contain (in addition to Xe and $N_2$) fluorinated compounds (e.g., $C_4F_6$, $COF_2$, $XeF_2$, $CF_4$ and $SiF_4$), $H_2O$, $O_2$ and/or $CO_2$. In such embodiments, it is preferred to provide the feed gas by passing the gas mixture through a surge vessel to adsorb at least one of fluorinated compounds, $H_2O$, $O_2$ and/or $CO_2$ more effectively than Xe. The surge vessel preferably contains a getter material to adsorb $H_2O$, $CO_2$, and/or fluorinated molecules. The effluent from the surge vessel can optionally be diluted with $N_2$ to provide the feed gas for feeding into the adsorption apparatus.

The feed gas fed to the adsorption vessel has a preferred temperature range of 0° C. to 100° C., more preferably 50° C. to 80° C., and even more preferably 20° C. to 50° C. The feed gas fed to the adsorption vessel preferably has a pressure range of 1 to 10 bara, more preferably 5 to 10 bara, and even more preferably 1 to 5 bara.

The Xe recovery rate is preferably at least 80%, or at least 85%, or at least 90%. As used herein, the expression "Xe recovery rate" is defined as the amount of Xe recovered from the process divided by the amount of Xe fed into the adsorbent vessel. The Xe recovery rate can be determined through the use of mass spectrometry or gas chromatography.

The Xe concentration factor in the current invention is 15 to 25, or 18 to 20, or 20 to 22. The Xe concentration factor is defined as the concentration of Xe in the recovered stream divided by the concentration of Xe in the feed stream. For example, the Xe concentration factor is 15 where a final concentration of xenon in the product is 15 times greater than the initial concentration of xenon in the feed gas. The Xe concentration factor can be determined by mass spectrometry or gas chromatography.

Figure 1:
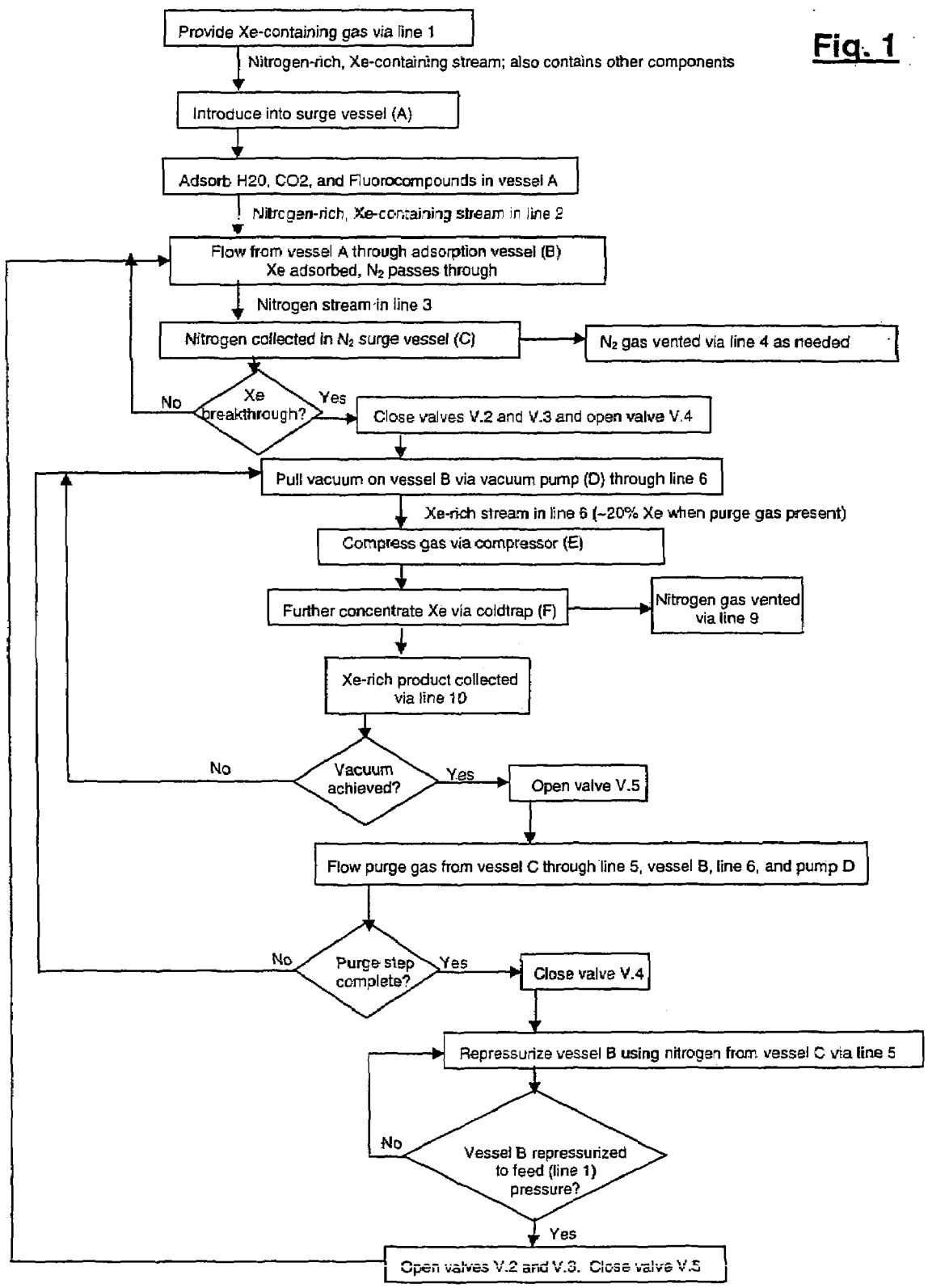
FIG. 1 is a flow chart of an embodiment of a vacuum swing adsorption process of the invention.
Figure 2:
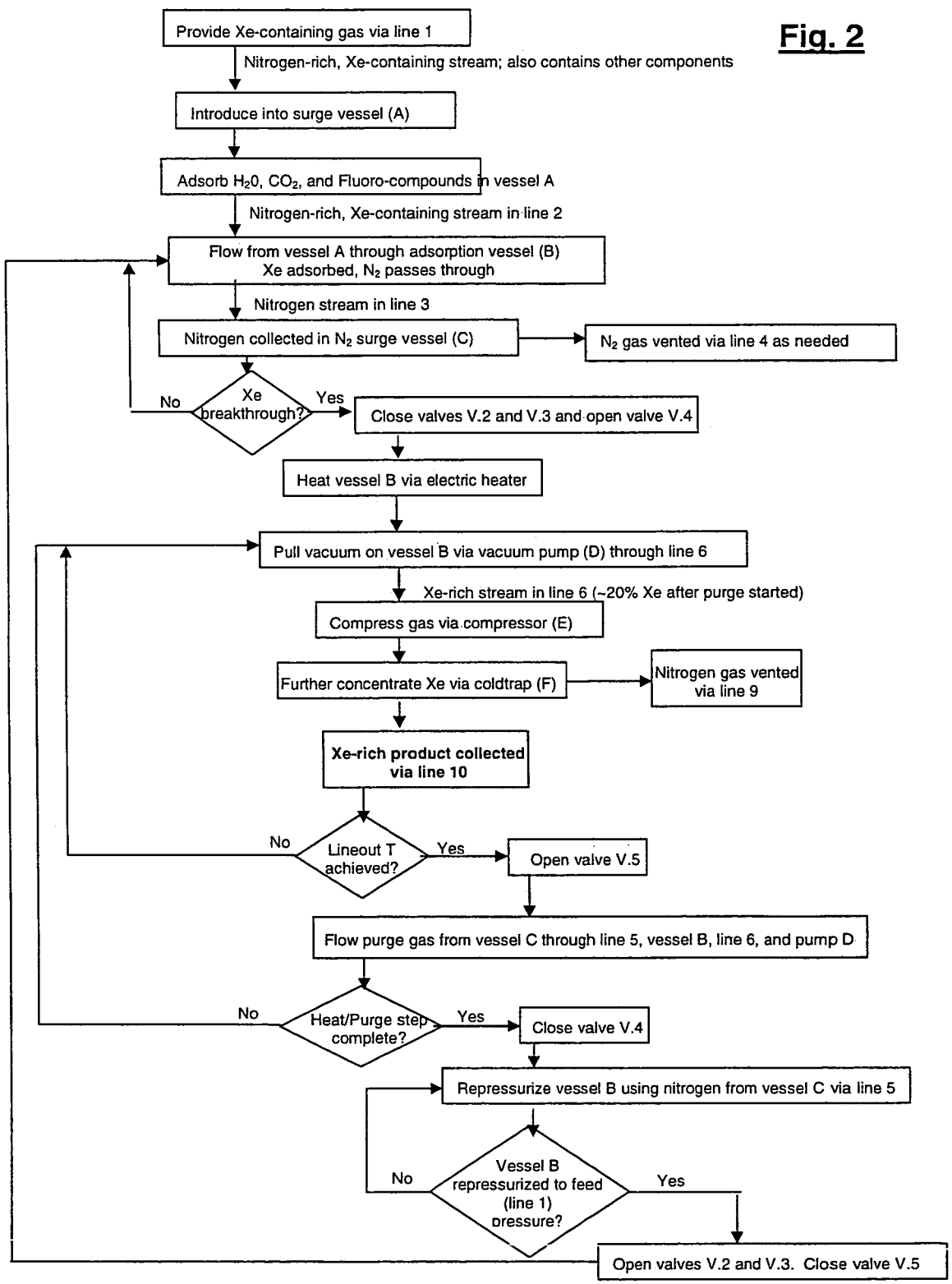
FIG. 2 is a flow chart of an embodiment of a temperature swing adsorption process of the invention.

The xenon is recovered either via a vacuum swing adsorption (VSA) process, or a temperature-swing adsorption (TSA) process. A flow chart of a preferred VSA process of the invention is shown in FIG. 1. A flow chart of a preferred TSA process of the invention is shown in FIG. 2.

The preferred embodiment of this invention is a VSA process. The VSA process includes four steps: feed, evacuation, purge, and repressurization.

Figure 3:
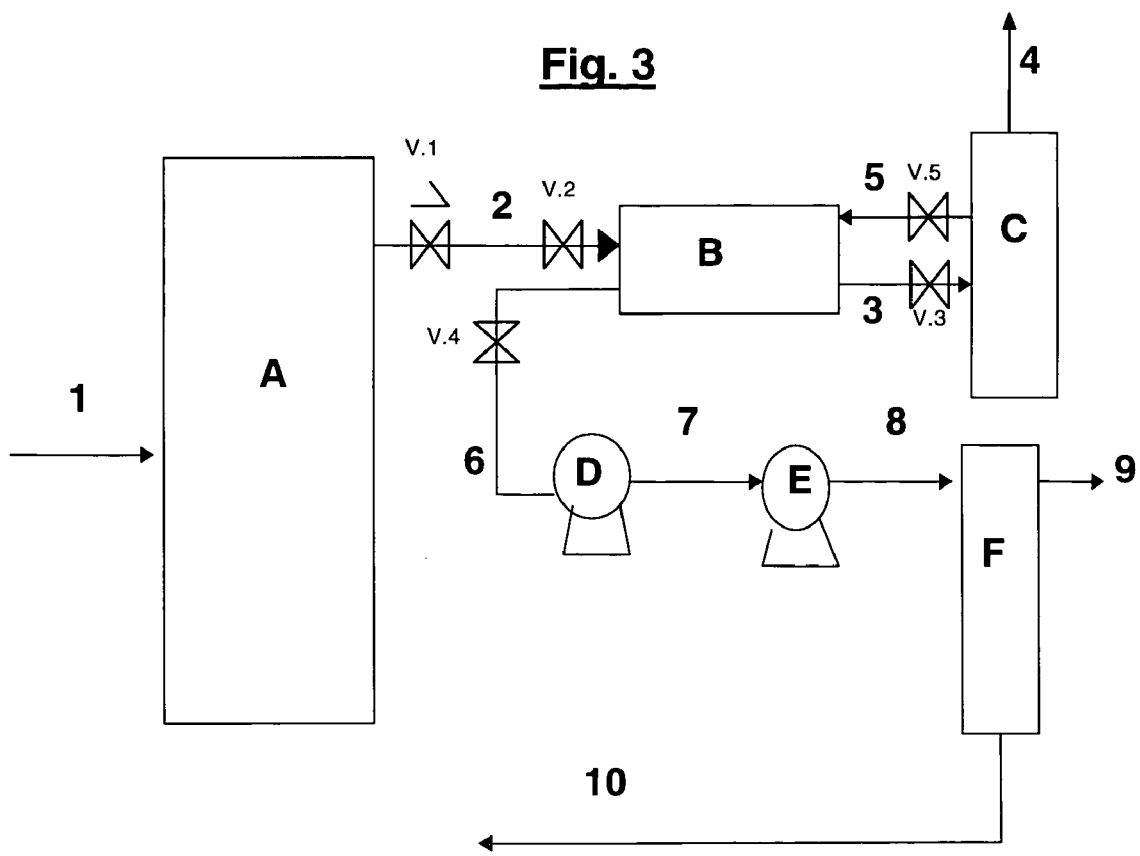
FIG. 3 is a schematic view of an embodiment of an apparatus of the invention.

Referring to FIG. 3, a production effluent stream first flows into surge vessel A through line 1. A check valve (V.1) prevents gas flow back to surge vessel A during the purge process step.

During the feed step, feed gas flows through line 2 from surge vessel A through valves V.1 and V.2 into adsorption vessel B. In the preferred embodiment of the current invention, there is only one adsorption vessel. Alternatively, multiple adsorption vessels can feed a single recovery unit.

Xenon in the feed gas is preferentially adsorbed in the adsorption vessel. The nitrogen gas passes through adsorption vessel B, line 3 and valve V.3 and into nitrogen surge vessel C downstream of the adsorption vessel. Nitrogen gas from vessel C can be collected from line 4 or vented. Xenon-containing feed gas is fed to adsorption vessel B until xenon breakthrough occurs, preferably as measured by mass spectrometer or gas chromatography.

The adsorbent used in the adsorption vessel for the VSA process has a Henry's Law constant, as calculated from adsorption isotherms in a standard volumetric adsorption unit, preferably equal to or less than 50 mmol/g/atm, or less than 45 mmol/g/atm, or less than 40 mmol/g/atm, at the operating temperature of the adsorption process.

The expression "$Xe/N_2$ selectivity ratio" (also referred to as the "$Xe/N_2$ ratio" and the "$Xe/N_2$ selectivity"), as used herein, is the ratio of the Xe to the $N_2$ Henry's Law constants at the adsorption temperature. The ratio is preferably less than 75, or less than 70, or less than 65. The result shown in FIG. 8 in the Examples teaches that high selectivity adsorbents are surprisingly not preferred for this invention using the VSA process.

The adsorbent particle size is preferably 0.5 to 3.0 mm, or 0.5 to 1.5 mm, or 1.5 to 3.0 mm. Suitable adsorbents include but are not limited to aluminas, zeolites, silica gels, or activated carbons.

At breakthrough, feed gas flow through line 2 is stopped and the evacuation step begins. During this step, adsorption vessel B is evacuated to sub-atmospheric pressure using vacuum pump D. Xenon-enriched gas passes through line 6 and valve V.4 on its way to vacuum pump D. Evacuation pressure preferably ranges from 0.0001 to 0.1 bara, or 0.0001 to 0.001 bara, or 0.001 to 0.01 bara.

In the purge step, the adsorption vessel is purged with gas to help desorb adsorbed xenon, and thereby provide additional xenon-enriched gas which is combined with the xenon-enriched gas from the evacuation step. The purge gas is typically the nitrogen effluent from the feed step, fed back to adsorption vessel B through line 5 and valve V.5 from surge vessel C. An alternate type and source of purge gas could be used. The purge step is preferably done under vacuum, and started after the evacuation step has started.

One of the key parameters in the VSA process is the purge to feed ratio. This value is calculated by determining the actual volume of purge gas used in one cycle divided by the actual volume of feed gas supplied during the cycle. A minimum purge to feed ratio of preferably 10 is required to obtain 80% Xe recovery rate with the current invention. More preferably, the purge to feed ratio is more than 50.

The product gas from vacuum pump D is conveyed though line 7 to compressor E, and compressed. Optionally, the xenon in the product gas can be further concentrated via a low temperature operation, by conveying the product gas through line 8 to cold trap F, in which the xenon is collected through line 10 as a liquid or solid and the nitrogen is vented as a gas through line 9. If desired, the recovered xenon is compressed, liquefied, solidified and/or adsorbed on a substrate to facilitate storage and shipment.

Following the purge step, adsorption vessel B is then repressurized to the feed pressure. This is typically done with effluent from the feed step, which has been stored in surge vessel C. Once the adsorption vessel is repressurized, the adsorption feed step begins again, and the process is repeated.

An alternate recovery process is TSA. The TSA process consists of the following four steps: feed, heat, purge, and repressurization.

The feed step of the TSA process can be identical to that of the VSA process, as described above.

The adsorbent used in the TSA process preferably differs from that of the VSA process. The adsorbent used in the adsorption vessel for the TSA process has a Henry's Law constant, as calculated from adsorption isotherms in a standard volumetric adsorption unit, preferably greater than or equal to 50 mmol/g/atm, or greater than 55 mmol/g/atm, or greater than 60 mmol/g/atm, at the operating temperature of the adsorption process.

The adsorbent particle size is 0.5 mm to 3 mm, or 0.5 mm to 1.5 mm, or 1.5 mm to 3.0 mm. Typical adsorbents include aluminas, zeolites, silica gels, and activated carbons.

At breakthrough, the feed gas is stopped and the heating step begins. During this step, the adsorption vessel (and/or the adsorbent) is heated to help desorb adsorbed xenon. Heating means are not particularly limited. Heat can typically be provided via an electric clamshell heater (not shown) placed around adsorption vessel B. The temperature during the heat step preferably ranges from 100° C. to 300° C., or 100° C. to 150° C., or 150° C. to 250° C.

In the purge step, the adsorption vessel is purged with gas to help desorb adsorbed xenon. This step typically starts after the adsorption vessel has reached the lineout temperature of the heat step. The purge gas is typically the nitrogen effluent from the feed step; however, an alternative purge gas and source could be used.

The gas recovered from the adsorption bed during the heat and purge steps is the xenon-rich product gas. As in the VSA process, the product gas can then be compressed using compressor E, and further concentrated using cold trap F.

Following the purge step, the adsorption vessel is then repressurized to the feed pressure. This is typically done with effluent from the feed step, which has been stored in vessel C. Once the adsorption vessel is repressurized, the adsorption feed step begins again, and the process is repeated.

EXAMPLES

The invention will be illustrated in more detail with reference to the following Examples, but it should be understood that the present invention is not deemed to be limited thereto.

Example 1 (Comparative)

A feed gas of 1% Xe in $N_2$ was introduced into an adsorption vessel containing 75 grams of AgLiX zeolite (20% Ag 80% LiX), 1 mm beads. The feed flow rate was 5050 cc/min, the feed time was 10 minutes, and the feed temperature was 23° C. After feeding for 10 minutes, the bed was evacuated to 0.0001 bara and a $N_2$ purge of 100 cc/min was started. After several cycles, the system reached steady state. The measured Xe recovery rate of the system was 42%. The key operating parameter for this process is Xe recovery rate. Since Xe is an expensive reagent, high Xe recovery rate is necessary for a viable Xe recycle system. Xe recovery rates of 80% or higher are desired.

Example 2 (Comparative)

The same experiment as described in Example 1 was carried out, except that the feed temperature was raised to 50° C. By raising the feed temperature, the Henry's Law constant for Xe adsorption on AgLiX was reduced. The Xe recovery rate of this system at steady state was 65%.

Example 3 (Comparative)

Example 2 was repeated, but this time the $N_2$ purge rate was increased to 200 cc/min. By increasing the purge rate, the purge to feed ratio of the PSA (or VSA) was increased. By increasing the P/F ratio, the Xe recovery rate at steady state was 75%.

Figure 4:
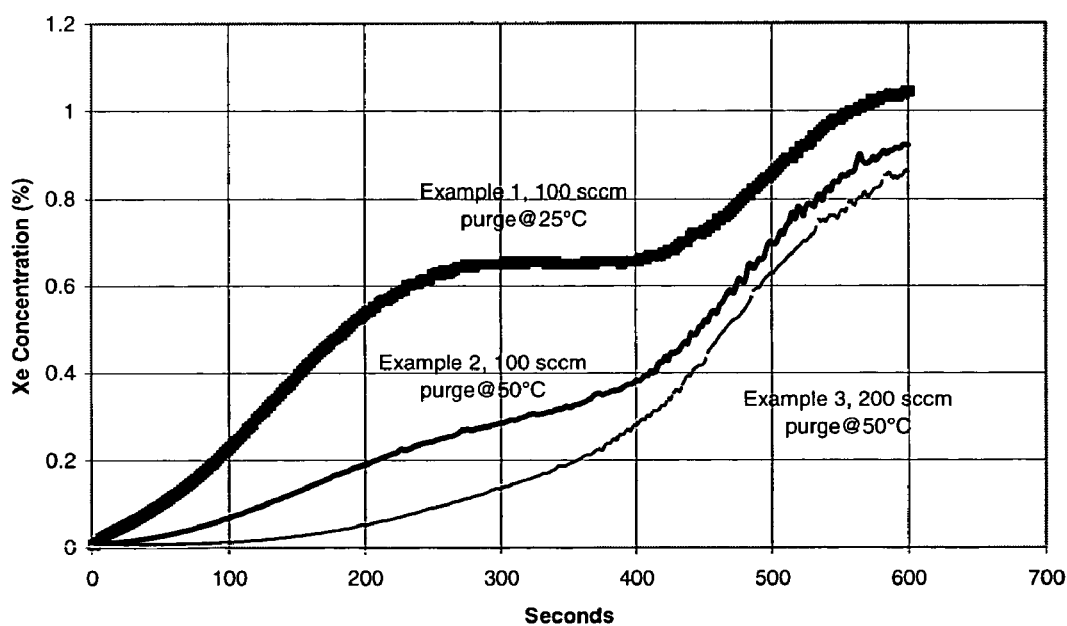
FIG. 4 is a graph of Xe breakthrough curves on AgLiX.

A comparison of the Xe breakthrough curves from Examples 1-3 is shown in FIG. 4.

Example 4

The same conditions used in Example 1 were used, but the adsorbent was changed to Jacobi GXK activated carbon, 1 mm extrudates. The feed time was reduced to 3 minutes and the adsorbent charge was 65 grams. After the system reached steady state the Xe recovery rate was 97%.

Example 5

The experiment described in Example 4 was carried out without a $N_2$ purge during evacuation. The Xe recovery rate without the purge step was 65%. This result shows the importance of a minimum P/F ratio needed to achieve high Xe recovery.

Example 6

Figure 5:
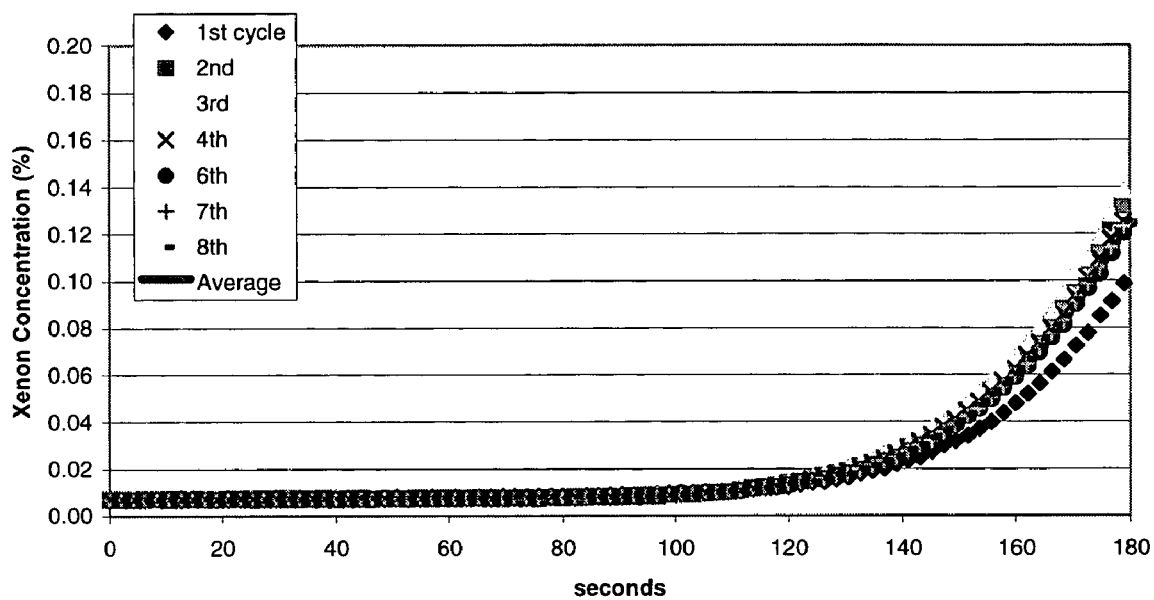
FIG. 5 is a graph showing the repeatability of Xe breakthrough profiles on activated carbon with actual plasma effluent.

The conditions of Example 4 were repeated, but this time the feed gas was actual effluent from a plasma etching reactor. During the etching process, Xe was added to $C_4F_6$ and $O_2$. A 100 mm wafer coated with 1 micrometer $SiO_2$ film was placed in the reactor. RF power was applied to the reactor and a plasma was ignited to etch the $SiO_2$ film. The effluent from the reactor was then diluted with $N_2$ to give a final exit composition of about 1% Xe. The Xe recovery rate measured was 98%. In addition to the high Xe recovery rate, the Xe breakthrough curve appears to be steady over time indicating no adsorbent degradation even in the presence of the etching byproducts, which include $CO_2$, $COF_2$, $CF_4$, $SiF_4$ and other species. The cycle Xe breakthrough curves are shown in FIG. 5.

Example 7

The experiment in Example 6 was re-run, but this time with a $N_2$ purge of 200 cc/min. The resultant Xe recovery rate was 99%.

The results in Examples 1-7 are given in Table 1 below:

TABLE 1

| Example | Adsorbent | Feed T (° C.) | Xe recovery (%) | $K_H$ Xe (mmole/g/atm) | P/F ratio (ACF basis) | Etch gas present |
|---|---|---|---|---|---|---|
| 1 | AgLiX | 23 | 42 | 1139 | 150 | No |
| 2 | AgLiX | 50 | 65 | 201 | 150 | No |
| 3 | AgLiX | 50 | 75 | 201 | 300 | No |
| 4 | Carbon | 23 | 97 | 10 | 150 | No |
| 5 | Carbon | 23 | 65 | 10 | 0.8 | No |
| 6 | Carbon | 23 | 98 | 10 | 150 | Yes |
| 7 | Carbon | 23 | 99 | 10 | 300 | Yes |

The Henry's Law constants ($K_H$) shown in Table 1 were determined by measurement of adsorption isotherms in a standard volumetric adsorption unit. The Henry's Law constant was calculated by measuring the amount adsorbed (mmole/g) at an equilibrium pressure of 0.001 atm and dividing the amount adsorbed by that equilibrium pressure. The P/F ratio was calculated by measuring the actual volume of purge gas and dividing that by the actual volume of feed gas. ACF basis stands for actual cubic foot basis.

Figure 6:
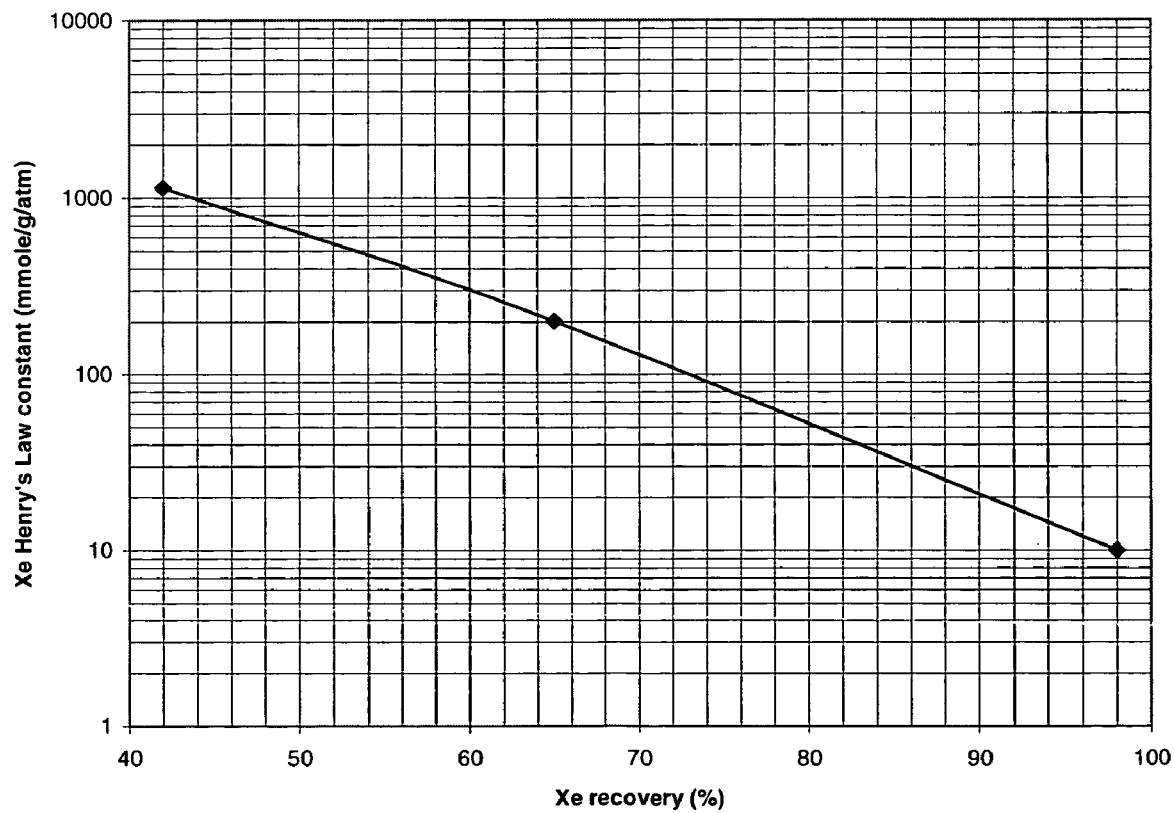
FIG. 6 is a graph of Xe Henry's Law Constant vs. Xe Recovery by Vacuum Swing Adsorption.

FIG. 6 shows a plot of Xe recovery rate vs. Xe Henry's Law constant at the adsorption feed temperature at a P/F ratio of 150 (Examples 1, 2 and 4). The plot shows that as the Henry's law constant decreases, the Xe recovery rate increases. The minimum Xe recovery rate allowable for an economic process is 80%. Based on that recovery rate, the maximum Xe Henry's Law constant desired is about 50 mmole/g/atm at the adsorption feed temperature.

Figure 7:
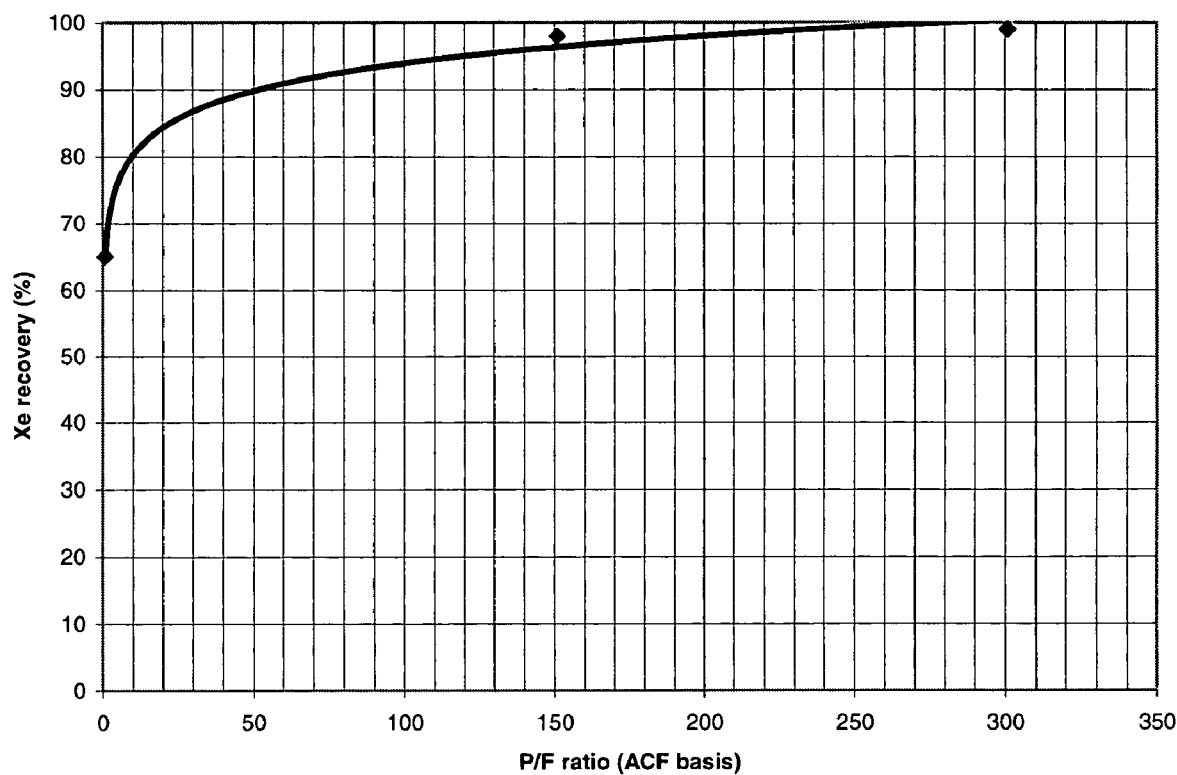
FIG. 7 is a graph of Xe Recovery vs. Purge to Feed Ratio.

FIG. 7 shows a plot of Xe recovery rate as a function of P/F ratio of the VSA. To get to a recovery rate of 80%, the minimum P/F ratio is about 10. Therefore, to get to Xe recovery rates of 80% or higher, P/F ratios of 10 or greater should be achieved. Typically, P/F ratios of adsorption process range in the neighborhood of 1.5 to 6.

Figure 8:
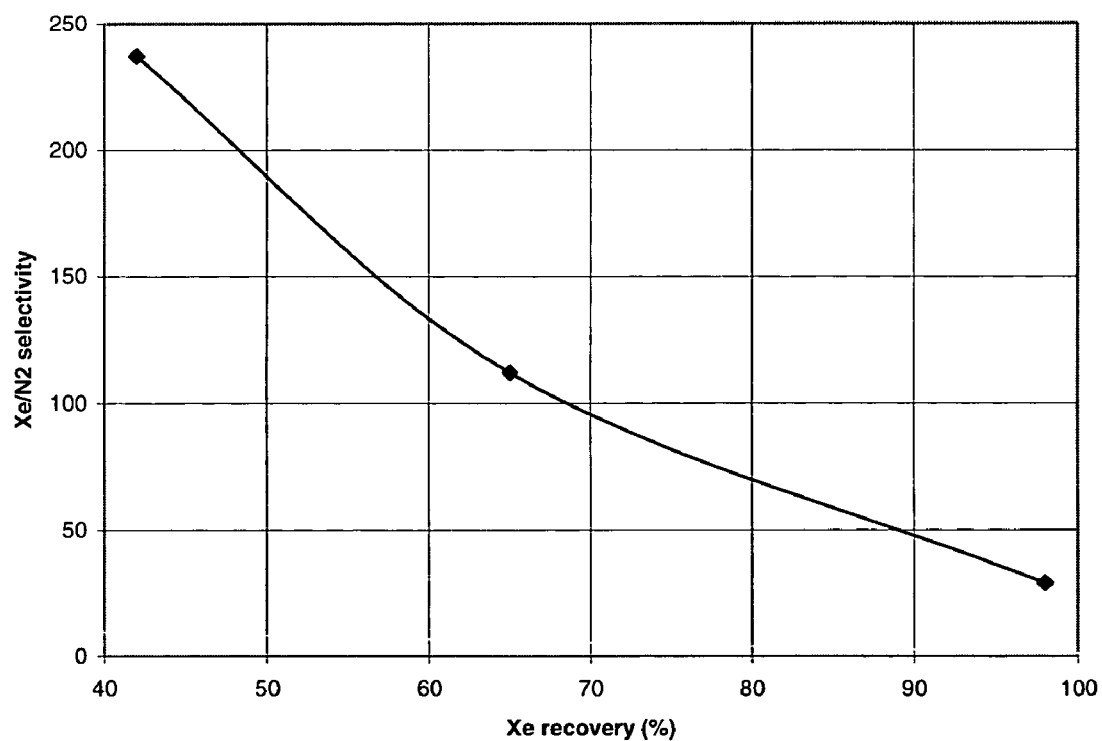
FIG. 8 is a graph of Xe/$N_2$ Selectivity vs. Xe Recovery.

FIG. 8 shows a plot of Xe recovery rate as a function of $Xe/N_2$ selectivity. The $Xe/N_2$ selectivity is merely the ratio of Xe Henry's Law constant divided by the $N_2$ Henry's law constant at the adsorption temperature. The measured $N_2$ Henry's law constants for $N_2$ on AgLiX at 23° C., 50° C. and on GXK activated carbon at 23° C. are 4.8, 1.8 and 0.34 mmole/g/atm, respectively. The results in FIG. 8 show that surprisingly high selectivity adsorbents are not preferred for this application. To get to Xe recoveries of 80% or higher, the maximum $Xe/N_2$ selectivity should be about 75.

Example 8

Xe and $N_2$ adsorption isotherms were measured at 30° C. on various other adsorbents. The results are shown in Table 2 below.

TABLE 2

| Adsorbent | $K_H$ Xe (mmole/g/atm) | $K_H$ $N_2$ (mmole/g/atm) | $Xe/N_2$ |
|---|---|---|---|
| UOP 13X | 1.2 | 0.20 | 6.0 |
| Grade 40 silica gel | 0.52 | 0.054 | 9.6 |

Both adsorbents have Xe Henry's constants less than 50 mmole/g/atm and have $Xe/N_2$ selectivities less than 75. As such, these adsorbents could be used in a VSA recovery system to obtain high Xe recovery rate.

Example 9

Table 3 shows some calculated process parameters comparing 13X, silica gel and activated carbon for Xe recovery by a VSA process. Table 3 gives a relative bed size, Xe recovery and Xe product concentration using the 3 different adsorbents at 25° C. and a P/F ratio of 150 with a feed of 1% Xe in $N_2$.

TABLE 3

| Adsorbent | Xe recovery rate | Relative bed size | % Xe in product |
|---|---|---|---|
| Activated carbon | 98% | 1.0 | 18.8% |
| 13X | 99% | 8.1 | 17.1% |
| Silica gel | 99% | 17.5 | 7.3% |

The primary requirement of this separation is high Xe recovery rate. Secondary, but also important is the Xe concentration in the product and bed size. Clearly, the larger the bed size required, the more capital for the bed. The Xe concentration in the product is also important. The recovered Xe must be further concentrated to get pure Xe, either by distillation or a cryotrap or both. It is desirable to obtain as pure a Xe stream as possible to minimize downstream processing or transportation costs if the material must be shipped for off-site purification.

Figure 9:
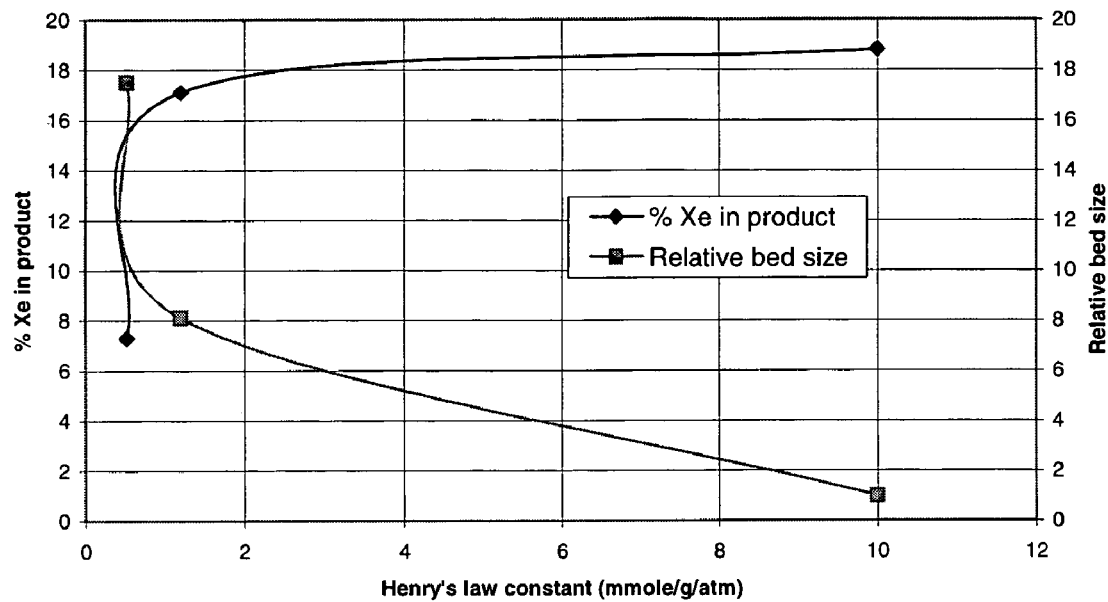
FIG. 9 is a graph of Relative Bed Size and Xe Product Composition as a Function of Henry's Law Constant.

The plot in FIG. 9 shows the Xe product composition and relative bed size for a Xe recovery VSA as a function of Henry's law constant. As previously noted, all these materials can obtain high Xe recovery rate in a VSA process. However, as shown in FIG. 9, if the Xe Henry's law constant at the feed temperature gets below a value of about 1.0 mmole/g/atm, the Xe product composition drops sharply and the bed size increases drastically. This helps define an optimum Henry's law constant for Xe adsorption at the operating temperature of from 1 to 50 mmole/g/atm.

Example 10

Experiments were conducted to investigate the temperature required to regenerate Xe from strongly materials like AgLiX, i.e., materials with Xe Henry's law constants of 50 mmole/g/atm or higher. Table 4 below shows the Xe Henry's law constant at 23° C. following various regeneration temperatures on AgLiX.

TABLE 4

| Regeneration temperature (° C.) | Xe Henry's law constant (mmole/g/atm) |
|---|---|
| 50 | 753 |
| 100 | 986 |
| 125 | 1005 |
| 150 | 1139 |

The results in Table 4 show that for a TSA process to recover Xe, a regeneration temperature of 150° C. must be used when the Xe Henry's law constant is 1139 mmole/g/atm.

Example 11

The Xe concentration in the reactor effluent gas tends to be about 1% Xe. If the feed pressure into the adsorber is atmospheric (which is preferred, no need for compression), the Xe partial pressure into the adsorber is 0.01 atm. The Xe capacity at 23° C. at that partial pressure is 0.83 mmole/g. Typical reactor effluents are about 50 liters/min and a typical site might house 10 reactors. This yields a total flow of about 500 liters/min. If the TSA is required to remain on-line for 4 hours, the total Xe challenge is:

500 liters/min×240 min/cycle×1 gmole/22.4 liters× 0.01=54 gmole Xe.

The adsorbent required for that time on-line is:

54 gmole×1 g/0.83×10−3 gmole=65,000 g=143 lbs=3.3 ft$^3$ of vessel.

For activated carbon, the Xe capacity at 0.01 atm is about 0.1 mmole/g. Therefore the total adsorbent requirement would be 1189 lbs (40 ft$^3$ of vessel).

Figure 10:
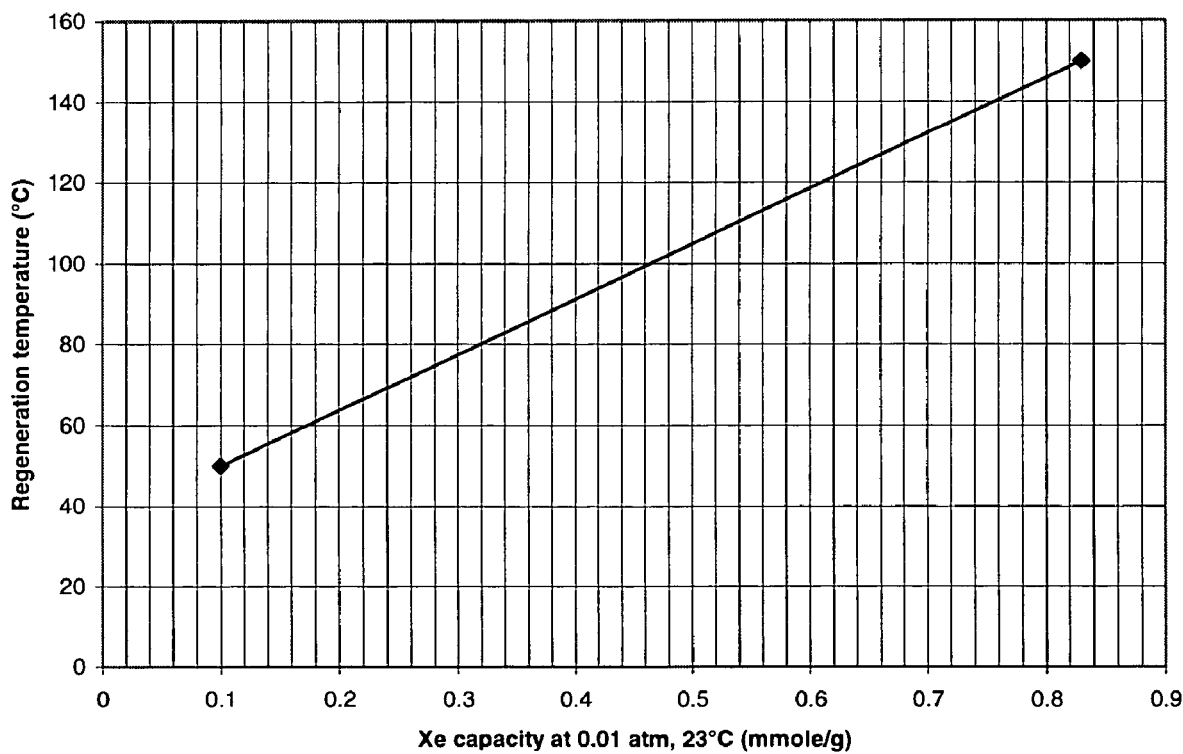
FIG. 10 is a graph showing the Effect of Xe Capacity on Required Regeneration Temperature.

Clearly, for use in a TSA, higher capacity at 0.01 atm is preferred. However, these higher capacities also require higher regeneration temperatures (carbon vs AgLiX). The results in FIG. 6 show that a Xe Henry's constant of 50 is required to get a Xe recovery rate of 80% in the VSA process. At a Henry's constant of 50 mmole/g/atm, the Xe capacity of the material at 0.01 atm is estimated to be 0.5 mmole/g. FIG. 10 shows a plot of Xe capacity at 23° C. vs. regeneration temperature. At a Xe capacity of 0.5 mmole/g, the regeneration temperature required is about 100° C. Therefore, adsorbents having a minimum Henry's constant of 50 mmole/g/atm and a minimum regeneration temperature of 100° C. are preferred for use in TSA embodiments of the invention.

While the invention has been described in detail and with reference to specific examples thereof, it will be apparent to one skilled in the art that various changes and modifications can be made therein without departing from the spirit and scope thereof.

The invention claimed is:

1. A process of recovering xenon from a feed gas, said process comprising the steps of:
   providing an adsorption vessel containing an adsorbent having a Xe/N2 selectivity ratio of less than 75;
   feeding a feed gas into the adsorption vessel, wherein the feed gas comprises an initial concentration of nitrogen greater than 50% and an initial concentration of xenon of at least 0.5%;
   evacuating the adsorption vessel by reducing a pressure of the adsorption apparatus below atmospheric pressure to recover a first xenon-enriched gas;
   purging the adsorption vessel at a purge to feed ratio of at least 10 to recover a second xenon-enriched gas; and
   combining the first xenon-enriched gas and the second xenon-enriched gas to provide a product gas comprising a final concentration of xenon at least 15 times greater than the initial concentration of xenon.

2. The process of claim 1, further comprising repressurizing the adsorption vessel after the purging step and repeating the steps of the process at least once.

3. The process of claim 1, further comprising condensing and cooling the product gas, and removing an additional amount of nitrogen gas from the product gas to provide a solid or liquid product comprising xenon.

4. The process of claim 1, wherein the feed gas comprises an effluent gas of a semiconductor-related manufacturing process.

5. The process of claim 4, wherein the effluent gas comprises Xe and at least one member selected from the group consisting of HF, $F_2$, $H_2O$, $C_4F_6$, $O_2$, $CO_2$, $COF_2$, $XeF_2$, $CF_4$ and $SiF_4$, is passed through a surge vessel to adsorb at least one of $H_2O$, $CO_2$, and fluorinated molecules from the effluent gas, and is diluted with $N_2$ to provide the feed gas for feeding into the adsorption apparatus.

6. The process of claim 1, wherein the initial concentration of xenon is 0.5% to 5.0%.

7. The process of claim 1, wherein the feed gas has a temperature range of 0 to 100° C. and a pressure range of 1 to 10 bara.

8. The process of claim 1, wherein the adsorbent comprises at least one member selected from the group consisting of an alumina, a zeolite, a silica gel and an activated carbon.

9. The process of claim 1, wherein the adsorbent consists essentially of particles having a diameter of 0.5 to 3.0 mm.

10. The process of claim 1, wherein a xenon recovery rate is at least 80%.

11. The process of claim 1, wherein the process is conducted in a vacuum swing adsorption apparatus containing only one adsorption vessel.

12. A xenon recovery apparatus adapted to perform the process of claim 1, said apparatus comprising:
- a surge vessel in fluid communication with a source of an effluent gas comprising Xe and at least one member selected from the group consisting of $H_2O$, $O_2$ and $CO_2$, wherein the surge vessel contains a material adapted to adsorb from the effluent gas at least one of $H_2O$, $O_2$ and $CO_2$ more effectively than Xe;
- an adsorption vessel in fluid communication with the surge vessel, and containing an adsorbent having a $Xe/N_2$ selectivity ratio of less than 75;
- a nitrogen surge vessel adapted to receive nitrogen from the adsorption vessel during the evacuating step and supply nitrogen to the adsorption vessel during the purging step;
- a pump adapted to evacuate the first xenon-enriched gas from the adsorption vessel;
- a compressor adapted to compress the product gas;
- a cold trap adapted to cool the compressed product gas so as to remove an additional amount of nitrogen gas from the product gas to provide a solid or liquid product comprising xenon; and
- control electronics programmed to maintain the purge to feed ratio of at least 10.

13. A process of recovering xenon from a feed gas, said process comprising the steps of:
- providing an adsorption vessel containing an adsorbent having a Xe Henry's law Constant of at least 50 mmole/g/atm;
- feeding a feed gas into the adsorption vessel, wherein the feed gas comprises an initial concentration of nitrogen greater than 50% and an initial concentration of xenon of at least 0.5%;
- heating the adsorbent to a temperature of at least 100° C. to recover a first xenon-enriched gas;
- purging the adsorption vessel to recover a second xenon-enriched gas;
- combining the first xenon-enriched gas and the second xenon-enriched gas to provide a product gas comprising a final concentration of xenon at least 15 times greater than the initial concentration of xenon; and
- repressurizing the adsorption vessel after the purging step and repeating the steps of the process at least once.

14. The process of claim 13, further comprising condensing and cooling the product gas, and removing an additional amount of nitrogen gas from the product gas to provide a solid or liquid product comprising xenon.

15. The process of claim 13, wherein the feed gas comprises an effluent gas of a semiconductor-related manufacturing process.

16. The process of claim 15, wherein the effluent gas comprises Xe and at least one member selected from the group consisting of HF, $F_2$, $H_2O$, $C_4F_6$, $O_2$, $CO_2$, $COF_2$, $XeF_2$, $CF_4$ and $SiF_4$, is passed through a surge vessel to adsorb at least one of $H_2O$, $CO_2$, and fluorinated molecules from the effluent gas, and is diluted with $N_2$ to provide the feed gas for feeding into the adsorption apparatus.

17. The process of claim 13, wherein the initial concentration of xenon is 0.5% to 5.0%.

18. The process of claim 13, wherein the feed gas has a temperature range of 0 to 100° C. and a pressure range of 1 to 10 bara.

19. The process of claim 13, wherein the adsorbent comprises at least one member selected from the group consisting of an alumina, a zeolite, a silica gel and an activated carbon.

20. The process of claim 13, wherein the adsorbent consists essentially of particles having a diameter of 0.5 to 3.0 mm.

21. The process of claim 13, wherein the heating step comprises raising the temperature of the adsorbent to 100-300° C.

22. The process of claim 13, wherein the process is conducted in a temperature swing adsorption apparatus containing only one adsorption vessel.

23. The process of claim 13, wherein a xenon recovery rate is at least 80%.

24. A xenon recovery apparatus adapted to perform the process of claim 13, said apparatus comprising:
- a surge vessel in fluid communication with a source of an effluent gas comprising Xe and at least one member selected from the group consisting of $H_2O$, $O_2$ and $CO_2$, wherein the surge vessel contains a material adapted to adsorb from the effluent gas at least one of $H_2O$, $O_2$ and $CO_2$ more effectively than Xe;
- an adsorption vessel in fluid communication with the surge vessel, and containing an adsorbent having a Xe Henry's Constant of at least 50 mmole/g/atm;
- a heater adapted to heat the adsorption vessel;
- a nitrogen surge vessel adapted to receive nitrogen from the adsorption vessel during the heating step and supply nitrogen to the adsorption vessel during the purging step;
- a compressor adapted to compress the product gas;
- a cold trap adapted to cool the compressed product gas so as to remove an additional amount of nitrogen gas from the product gas to provide a solid or liquid product comprising xenon; and
- control electronics programmed to adjust the heater to maintain the temperature of the adsorption vessel at 100° C. or more.

* * * * *

UNITED STATES PATENT AND TRADEMARK OFFICE
CERTIFICATE OF CORRECTION

PATENT NO. : 7,285,154 B2 Page 1 of 1
APPLICATION NO. : 10/996743
DATED : October 23, 2007
INVENTOR(S) : Eugene J. Karwacki, Jr.

It is certified that error appears in the above-identified patent and that said Letters Patent is hereby corrected as shown below:

Column 10, Line 31, Claim 1

In claim 1 delete the word "Xe/N2" and insert the word -- $Xe/N_2$ --

Signed and Sealed this

Eighteenth Day of December, 2007

JON W. DUDAS
*Director of the United States Patent and Trademark Office*